United States Patent
Engström

(10) Patent No.: US 8,175,607 B2
(45) Date of Patent: May 8, 2012

(54) NETWORK CONFIGURATION AUDIT

(75) Inventor: Stefan Engström, Stockholm (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 456 days.

(21) Appl. No.: 12/520,013

(22) PCT Filed: Dec. 18, 2006

(86) PCT No.: PCT/SE2006/050587
§ 371 (c)(1),
(2), (4) Date: Jun. 18, 2009

(87) PCT Pub. No.: WO2008/076018
PCT Pub. Date: Jun. 26, 2008

(65) Prior Publication Data
US 2010/0105398 A1    Apr. 29, 2010

(51) Int. Cl.
*H04W 40/00*     (2009.01)
*H04W 16/18*     (2009.01)

(52) U.S. Cl. .................. 455/446; 455/115.3; 455/226.2; 455/424

(58) Field of Classification Search .......... 455/446–449, 455/115.1–115.4, 226.1–226.4, 423–426.2, 455/67.11–67.7
See application file for complete search history.

(56) References Cited

U.S. PATENT DOCUMENTS

| | | | |
|---|---|---|---|
| 6,356,758 B1* | 3/2002 | Almeida et al. | 455/446 |
| 2002/0042268 A1* | 4/2002 | Cotanis | 455/423 |
| 2003/0147362 A1* | 8/2003 | Dick et al. | 370/324 |
| 2004/0116111 A1* | 6/2004 | Saunders | 455/423 |

FOREIGN PATENT DOCUMENTS

| | | | |
|---|---|---|---|
| JP | 2003-008498 A | 1/2003 | |
| JP | 2005-229453 A | 8/2005 | |

OTHER PUBLICATIONS

Grosso, E. et al. "Operating mobile networks through effective network inventory management," Network Operations and Management Symposium, 2004. NOMS 2004. IEEE/IFIP, vol. 2, No., pp. 31-44 vol. 2, Apr. 19-23, 2004.*
Grosso, E., et al. "Operating mobile networks through effective network inventory management", in Network Operations and Management Symposium, IEEE/IFIP 2004, Seoul Korea Apr. 19-23, 2004, ISBN 0-7803-8230-7, p. 31-44.

* cited by examiner

*Primary Examiner* — Meless N Zewdu
*Assistant Examiner* — Erica Navar

(57) ABSTRACT

A cell planning tool capable of determining the correctness of stored parameters regarding a cell site configuration, e.g., regarding the height of an antenna section or the output power. The correctness of the parameters is determined by importing a number of in-situ signal strength-measurements from measuring points located within the coverage area of said cell site and predicting the signal-strength at each of said measuring points, using said stored parameters. Thereafter, the difference between the imported and the corresponding predicted signal-strength is calculated for each measuring point, and a value indicating the correctness of the stored parameters is estimated, based on said calculated signal-strength differences.

27 Claims, 4 Drawing Sheets

NETWORK CONFIGURATION AUDIT

TECHNICAL FIELD

The present invention relates to a method in a cell planning tool, and to a cell planning tool, capable of determining the correctness of stored parameters associated with a cell site.

BACKGROUND

An operator of a mobile communication network, e.g. according to the GSM (Global System for Mobile communication) or UMTS (Universal Mobile Telecommunication System), is normally assisted by a cell planning tool in designing, planning and optimizing the network. A cellular mobile communication network comprises a large number of cell sites, each cell site comprising an antenna arrangement configured to provide the desired cell coverage. FIG. 1a is a perspective view illustrating an exemplary conventional antenna 12 of a cell site, and FIG. 1b is a top view of said antenna 12, schematically illustrating three antenna sectors, 14a, 14b, 14c, providing coverage in three cells, and the sectors may have different transmission frequencies. The antenna is mounted on the cell site with a certain configuration indicated by parameters regarding e.g. the height, the transmitting signal output power, antenna type and the direction, and parameters describing the network configuration is preferably stored in a cell planning tool of the operator.

A conventional cell planning tool is normally provided with several algorithms using the above-described stored parameters to calculate the network performance, and the algorithms may include e.g. traffic distribution algorithms and Monte Carlo simulators. The cell planning tool uses map data as input to the algorithms, together with various network configuration data regarding e.g. the base station hardware and other auxiliary hardware, such as feeders and combiners. The output from the cell planning tool comprises network performance information, such as e.g. an estimation of the cell site coverage area and the predicted signal strength in different locations within the coverage area, and the operator may use this information for cell planning in order to plan and optimize the network for achieving certain network key performance indicator targets.

Obviously, the parameters stored in the cell planning tool regarding e.g. the antenna configuration, such as the height and the angular orientation of the antenna, will always deviate to some extent from the actual height and angular orientation of the antenna, but preferably the deviations will be negligible. If the deviation of the network configuration parameters stored in the cell planning tool from the actual deployed network configuration parameters is negligible, the resulting errors in the output from the cell planning tool will be small. However, larger errors may sometimes occur, e.g. if the antenna element is not mounted on the intended height or with the intended angular orientation.

Thus, to avoid any detrimental effect on the network performance caused by large deviations, manual inspections and audits of the cell site and the antenna must be performed regularly in order to check e.g. that the mounting of the antenna section corresponds to the stored parameters regarding the height and angular orientation of the antenna, but such manual audits are very costly.

Therefore, it still presents a problem to correlate stored parameters associated with a cell site configuration in a cell planning tool with the actual deployed cell site configuration in a cost-efficient way, avoiding manual audits of the cell site.

SUMMARY

An object of the present invention is to address the problem outlined above, and this object and others are achieved by the method in a cell planning tool, and the cell planning tool, according to the appended claims.

According to a first aspect, the invention provides a method in a cell planning tool of determining the correctness of stored parameters associated with a cell site configuration, and the method comprises the following steps:

Importing in-situ signal strength-measurements, SSmeasure, from measuring points located within the coverage area of said cell site;

Predicting the signal-strength, SSpredict, at each of said measuring points using said stored parameters associated with the cell site configuration;

Calculating the signal strength-difference between the imported in-situ signal strength-measurements and the corresponding predicted signal-strength for each measuring point;

Estimating a value indicating the correctness of the stored parameters based of said calculated signal strength-differences.

Thereby, the number of manual network configuration audits of a cell site can be reduced considerably, since the operator will be able to determine the correctness of parameters stored in the cell planning tool without performing any manual network configuration audit. Only if this determination of the correctness reveals a deviation of the stored parameters from the actual parameters that is not negligible, a manual network configuration audit may have to be performed.

The above step of estimating a value indicating the correctness of the stored parameters may comprise the following sub-steps:

Dividing the coverage area into a selected number of segments;

Calculating a first average value, $\Delta$aver, for each segment separately, corresponding to the average of the calculated signal strength-differences of the segment;

Calculating a first standard deviation value, $\sigma 1$, for each segment separately, corresponding to the standard deviation of said calculated signal strength differences of the segment;

Calculating a second average value, $\sigma 1$aver, corresponding to the average of said calculated first standard deviation values; and Calculating a second standard deviation value, $\sigma 2$, corresponding to the standard deviation of said calculated first standard deviation values.

According to a second aspect, the invention relates to a cell planning tool for a network configuration, provided with an arrangement for determining the correctness of stored parameters associated with a cell site configuration, and the arrangement comprises a receiving unit adapted to import in-situ signal strength-measurements, SSmeasure, from measuring points located within the coverage area of said cell site, and a processing unit adapted to:

Predict the signal-strength, SSpredict, at each of said measuring points using said stored parameters associated with the cell site configuration;

Calculate the signal strength-difference between imported in-situ signal strength-measurements and the corresponding predicted signal-strength for each measuring point;

Estimate a value indicating the correctness of the stored parameters based of said calculated signal strength-differences.

The processing unit may be further adapted to:

Divide the coverage area into a selected number of segments;

Calculate a first average value, $\Delta$aver, for each segment separately, corresponding to the average of the calculated signal strength-differences for the segment;

Calculate a first standard deviation value, $\sigma1$, for each segment separately, corresponding to the standard deviation of said calculated signal strength differences for the segment;

Calculate a second average value, $\sigma1$aver, corresponding to the average of said calculated first standard deviation values;

Calculate a second standard deviation value, $\sigma2$, corresponding to the standard deviation of said calculated first standard deviation values.

The estimated value indicating the correctness may correspond to said second standard deviation value, $\sigma2$, and the calculated second average value $\sigma1$aver may indicate the correctness of the output signal power. The estimated value indicating the correctness may correspond to said first standard deviation value, $\sigma1$, if the number of segments is only one.

The segments may have a similar size, and extreme in-situ signal-strength measurement may be excluded in the calculations. Further, said segments may cover only a part of said coverage area, corresponding to substantially 90 degrees of the coverage area in the angular direction.

The number of segments may have a default value, e.g. nine, and the number of segments may be settable by the operator. Alternatively, the number of segments may be calculated automatically by the cell planning tool, depending on the number of imported in-situ signal-strength measurements.

The stored parameters may comprise e.g. the output signal power, the height, and the angular orientation of each of the antenna-sections of the cell site.

BRIEF DESCRIPTION OF THE DRAWINGS

The present invention will now be described in more detail and with reference to the accompanying drawings, in which.

DETAILED DESCRIPTION

Figure 1A:
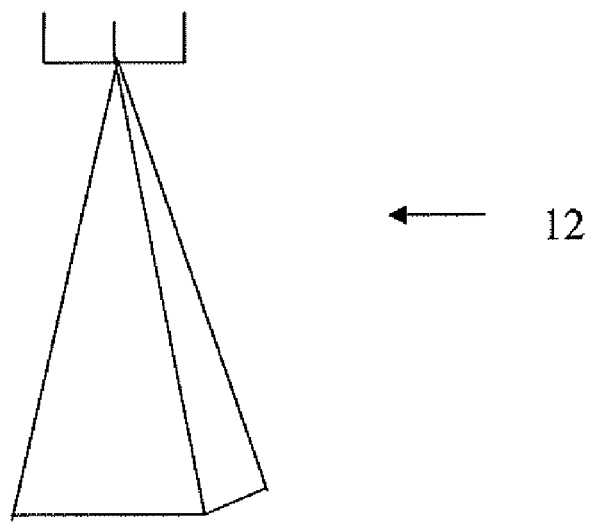
FIG. 1a is a perspective view of an exemplary antenna configuration of a cell site.
Figure 1B:
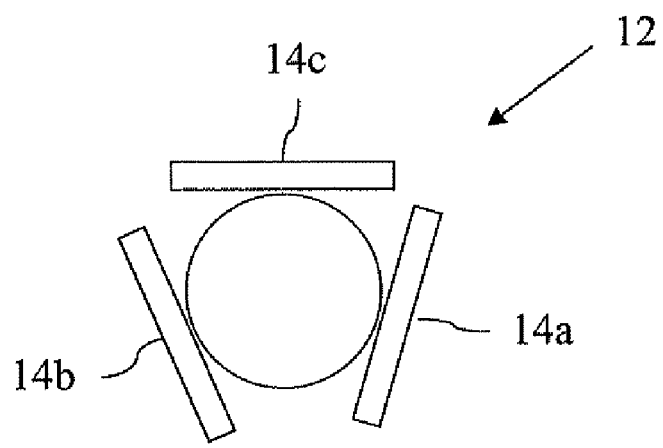
FIG. 1b is a top view of said antenna, illustrating the three sectors of the antenna.

In the following description, specific details are set forth, such as a particular architecture and sequences of steps in order to provide a thorough understanding of the present invention. However, it is apparent to a person skilled in the art that the present invention may be practised in other embodiments that may depart from these specific details.

Moreover, it is apparent that the described functions may be implemented using software functioning in conjunction with a programmed microprocessor or a general purpose computer, and/or using an application-specific integrated circuit. Where the invention is described in the form of a method, the invention may also be embodied in a computer program product, as well as in a system comprising a computer processor and a memory, wherein the memory is encoded with one or more programs that may perform the described functions.

A network operator regularly performs manual measurements relating to the cell site by collecting measurement data, e.g. using a vehicle equipped with an antenna travelling within the coverage area of the cell site and measuring the signal strength at different positions, and storing the collected signal strength values, together with the position of the measuring points. This invention determines the correctness of the stored parameters in a cell planning tool by an added functionality capable of importing such measurements collected by the operator regarding the signal strength at different positions within the coverage area of the cell site, and comparing these measurements with the predicted signal strength values in said positions, the prediction performed by the cell planning tool, based on said stored parameters.

According to this invention, a value indicating the correctness of the stored cell site configuration-parameters in the cell planning tool is estimated based on calculated differences between the in-situ measured signal strength and the predicted signal strength in a suitable number of measuring points within the coverage area of the cell site. The estimation is performed by a suitable statistical procedure, e.g. by simply determining the average value of the calculated differences between the measured signal strength and the predicted signal strength in the measuring points, or by a more complex mathematical process, which may include dividing the coverage area into a suitable number of segments.

Thereafter, this estimated value indicating the correctness may e.g. be compared to a predetermined threshold value in order to determine whether the deviation is acceptable. If not, the operator has the option to e.g. adjust the antenna transmission output power, or to perform a manual inspection of the cell site in order obtain more correct parameters to be stored in the cell planning tool. The cell site configuration parameters stored in the cell planning tool may comprise the output signal power of each of the antenna-sections of the cell site, the height of each of the antenna-sections of the cell site or the angular orientation of each of the antenna sections of the cell site.

Figure 2:
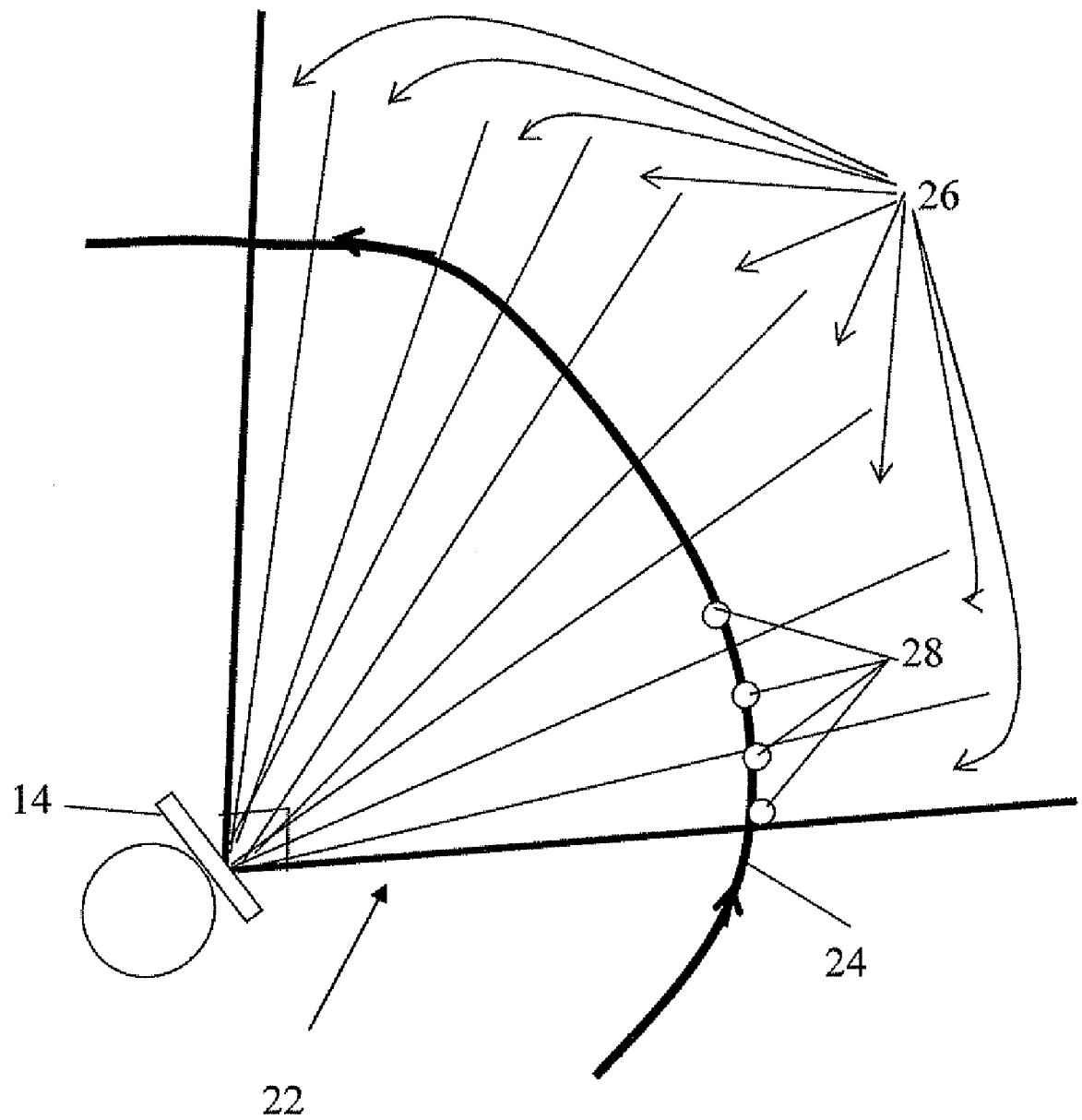
FIG. 2 is a top view of a part of the coverage area divided into nine segments, according to one embodiment of this invention.

The invention will now be described with reference to FIG. 2, which is a top view schematically illustrating an antenna segment 14 of a cell site, and a part of the coverage area 22 divided into nine segments 26. Measuring values regarding the actual signal strength and the position have been collected by the operator in a suitable number of measuring points 28, by a person or a vehicle provided with measuring equipment and travelling a path 24. According to this invention, a cell planning tool imports the collected signal strength measurements, as well as the corresponding positions, and identifies the serving cell for each measurement in order to determine the measurements associated with a specific cell site. Next, the cell planning tool predicts the signal strength value in the measuring points, and calculates the difference in signal strength between the imported values and said predicted values, SSmeas−SSpred=$\Delta$ for each measuring point. Thereafter, an estimation of the correctness of the stored parameters is performed, based of said calculated signal strength-differences.

According to a first embodiment of the invention, the coverage area is divided into a suitable number of segments 26, normally at least four and less than twenty, depending e.g. on the number of imported in-situ measurements associated with a certain cell site. A default value of the number of segments is preferably stored in the cell planning tool, and this default value may e.g. be around nine, in order to achieve satisfactory accuracy.

According to further exemplary embodiments, the number of segments is settable by the operator, or calculated by the cell planning tool, depending e.g. on the number of imported signal strength measurements. Further, in the illustrated embodiment, only a part of the coverage area is used, corresponding to an area within ±45 degrees from the serving antenna. However, any other suitable portion of the coverage area may be used, or the entire coverage area, and the coverage area may be divided into any suitable number of segments, or into only one segment, e.g. depending on the number of imported measurements an on the required correctness and speed of the calculations.

According to this first embodiment, a first average value, $\Delta$aver, is calculated for each individual segment, representing the average signal strength difference for the measuring points for the segment, but some values may be excluded, e.g. extreme values. Thereafter, a first standard deviation value, $\sigma 1$, is calculated for each of the segments, representing the standard deviation of the signal strength differences in the segment. Next, a second average value, $\sigma 1$aver, is calculated, representing the average of said calculated first standard deviation values. Based on this second average value, a second standard deviation value, $\sigma 2$, is calculated, representing the standard deviation of said calculated first standard deviation values. However, a segment containing very few measuring points may be excluded from the calculation.

Said second standard deviation value, $\sigma 2$, will indicate specifically the correctness of the stored cell site configuration parameters, and a large standard deviation value will indicate a larger deviation, and a smaller standard deviation value will indicate a smaller deviation, and more correct stored parameters.

The second average value, $\sigma 1$aver, will indicate the correctness of the stored output signal power-parameter, and a large second average value will indicate a larger deviation in the stored output signal power.

According to a further embodiment, said first standard deviation value, $\sigma 1$, representing the standard deviation of the signal strength differences, will be used as an indication of the correctness of the stored parameters, in case the coverage area is divided into only one segment. Alternatively, it is possible to use said first calculated average value, $\Delta$aver, as an indication of the correctness of the stored parameters, but the standard deviation, $\sigma 1$, will normally give a better estimation.

The suitable number of segments depends on the number of measuring points, and fewer segments will result in a faster calculation, while a larger number of segments will increase the accuracy.

Figure 3:
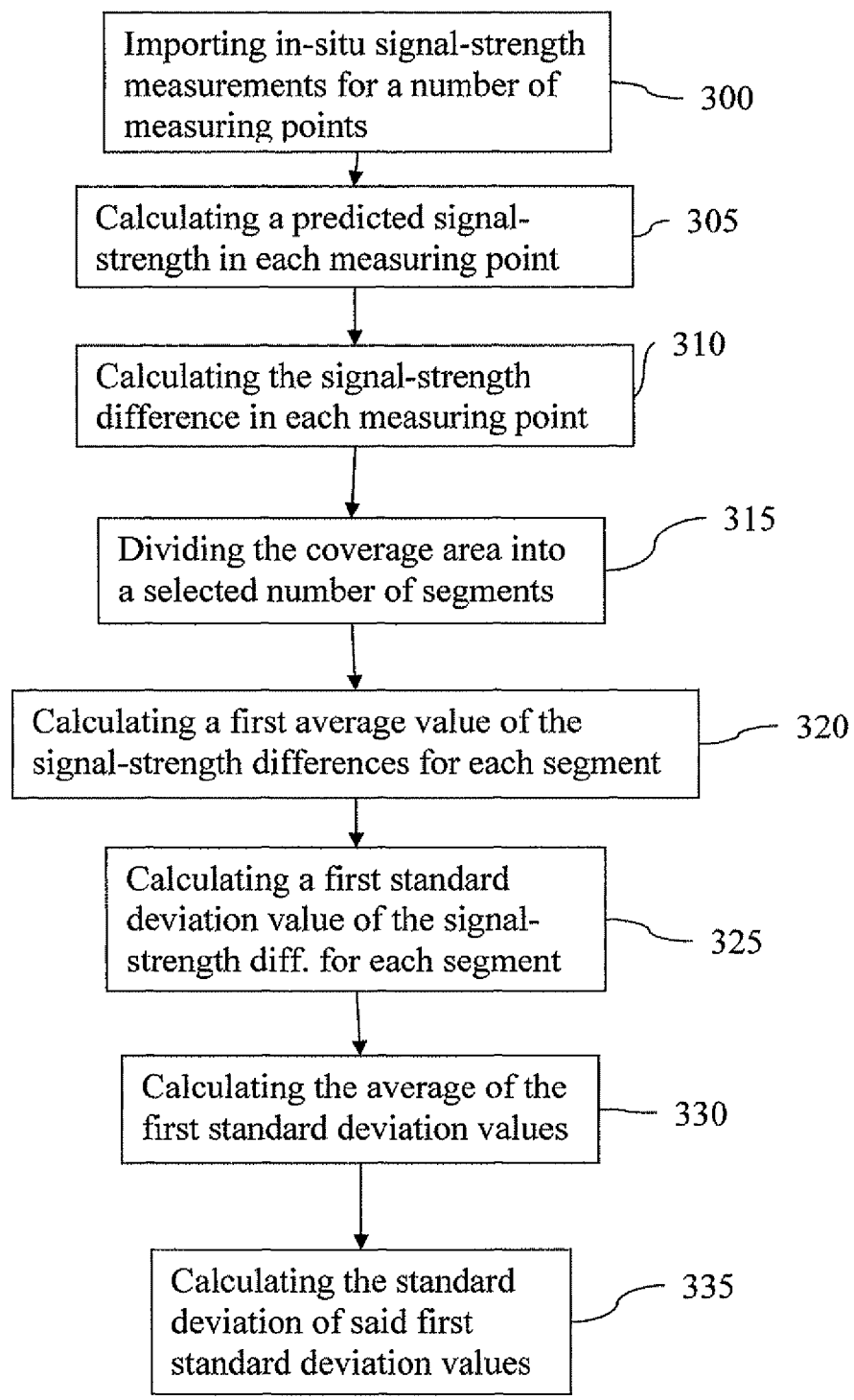
FIG. 3 is a flow diagram of an exemplary embodiment of the method according to the invention.

FIG. 3 is a flow chart illustrating an exemplary embodiment of this invention, in which a number of signal strength measurements are imported, and the coverage area is divided into a selected number of segments. In step 300, a number of collected and stored in-situ signal strength-measurements, SSmeasure, from measuring points located within the coverage area of said cell site, are imported, together with the position of each measuring point. Thereafter, a predicted signal-strength, SSpredict, is calculated for each of said measuring points, in step 305, using said stored parameters associated with the cell site configuration. In step 310, the signal strength-difference between the imported in-situ signal strength-measurements and the corresponding predicted signal-strength is calculated for each measuring point, and in step 315, the coverage area is divided into a selected number of segments having approximately similar size, each segment including a suitable number of measuring points. In step 320, a first average value, $\Delta$aver, is calculated for each segment separately, corresponding to the average of the calculated signal strength-differences for the segment, and a first standard deviation value, $\sigma 1$ is calculated for each segment separately, in step 325, corresponding to the standard deviation of the signal strength differences for the segment. Next, in step 330, a second average value, $\sigma 1$aver, is calculated, corresponding to the average value of the standard deviations of all the segments, and a second standard deviation value is calculated, in step 335, corresponding to the standard deviation of the first standard deviation values. This calculated second standard deviation value, $\sigma 2$, indicates the correctness of the stored parameters, and a large standard deviation value will indicate a larger deviation, i.e. a larger error in the stored network configuration parameters, while the calculated second average value, $\sigma 1$aver, indicates the correctness of the output signal power.

Figure 4:
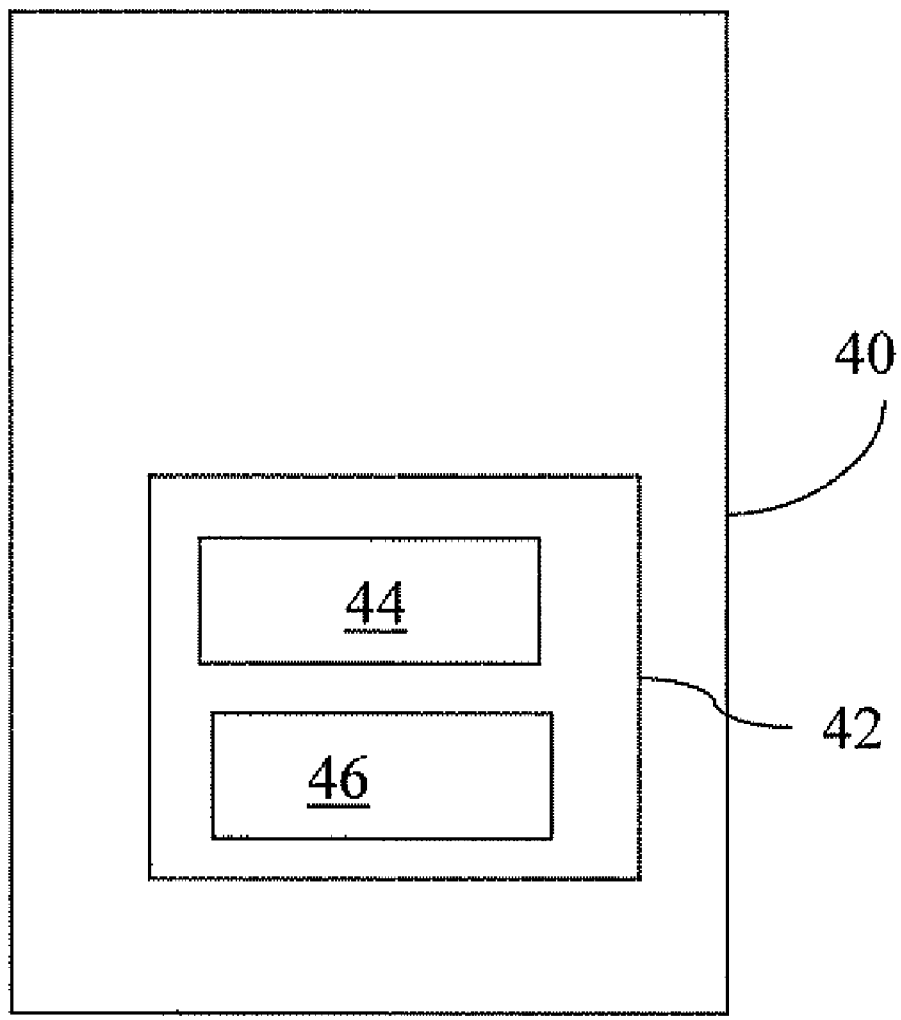
FIG. 4 is a block diagram illustrating a cell planning tool provided with an arrangement according this invention.

FIG. 4 is a block diagram illustrating a cell planning tool according to an exemplary embodiment of this invention, comprising a cell planning tool 40 provided with an arrangement 42 for determining the correctness of stored parameters associated with a cell site configuration. This arrangement comprises a receiving unit 44 adapted to import in-situ signal strength-measurements, SSmeasure, and the corresponding positions, from a number of measuring points located within the coverage area of said cell site, and a processing unit 46 adapted to predict the signal-strength, SSpredict, at each of said measuring points using stored parameters associated with the cell site configuration.

According to a first embodiment, the processing unit 46 is adapted to divide the coverage area into a number of segments, each segment including a suitable number of measuring points. The processing unit is further adapted to calculate a first average value, $\Delta$aver, for each segment separately, representing the average of the signal strength-difference in the measuring points for the segment. Next, a first standard deviation value, $\sigma 1$, is calculated for each segment separately, representing the standard deviation of the signal strength differences for the segment, and, thereafter, a second average value, $\sigma 1$aver, is calculated, representing the average of said first standard deviation values. Finally, a second standard deviation value $\sigma 2$, is calculated, representing the standard deviation of said first calculated standard deviation values. According to a first embodiment of the invention, the processing unit is adapted to use this second standard deviation value, $\sigma 2$, as an indication of the correctness of the stored parameters in the cell planning tool.

According to a further embodiment, the processing unit 46 is adapted to use said second calculated average value, $\sigma 1$aver, as an indication of the correctness of the stored output power-parameter.

According to a second embodiment, the processing unit 46 is adapted to use said calculated first standard deviation value, $\sigma 1$, of the signal strength differences as an indication of the correctness of the stored parameters, in case the coverage are is divided into only one segment, or alternatively, said calculated first average value, $\Delta$aver, of the signal strength differences in each measuring point.

According to another embodiment of the cell planning tool, a default value of the number of segments is stored, and a suitable default value of the number of segments may e.g. be around nine, in order to achieve a satisfactory accuracy. According to a further exemplary embodiment, the number of segments is settable by the operator. According to another embodiment, the processing unit is adapted to divide the coverage area into a suitable number of segments, normally at least four and less than twenty, depending e.g. on the number of imported measurements associated with a certain cell site.

Further, according to an exemplary embodiment, the processing unit is adapted to use only a part of the coverage area, corresponding to an area within ±45 degrees from the serving antenna. However, any other suitable portion of the coverage area may be used, or the entire coverage area, and the coverage area may be divided into any suitable number of segments, or into only one segment, e.g. depending on the number of imported measurements.

This invention may e.g. be implemented as an added functionality in an existing cell planning tool, enabling the operator to determine the correctness of the stored parameters without a manual network configuration audit. Only if the determination of the correctness, according to this invention, reveals a deviation of the stored parameters from the actual parameters that is not negligible, a manual network configuration audit may have to be performed. Thereby, the need of manual network configuration audits will be reduced considerably.

While the invention has been described with reference to specific exemplary embodiments, the description is in general only intended to illustrate the inventive concept and should not be taken as limiting the scope of the invention.

The invention claimed is:

1. A method in a cell planning tool of determining the correctness of stored parameters associated with a cell site configuration, the method comprising the steps of:
   importing in-situ signal-strength measurements, SSmeasure, from measuring points located within the coverage area of the cell site;
   predicting the signal strength, SSpredict, at each of the measuring points utilizing the stored parameters associated with the cell site configuration;
   calculating the signal-strength difference between the imported in-situ signal-strength measurements and the corresponding predicted signal strength for each measuring point; and
   estimating a value indicating the correctness of the stored parameters based on the calculated signal-strength differences, wherein the estimating step includes the substeps of:
      dividing the coverage area into a selected number of segments;
      calculating a first average value, $\Delta$aver, for each segment separately, corresponding to the average of the calculated signal-strength differences of the segment;
      calculating a first standard deviation value, $\sigma 1$, for each segment separately, corresponding to the standard deviation of said calculated signal-strength differences of the segment;
      calculating a second average value, $\sigma 1$aver, corresponding to the average of said calculated first standard deviation values; and
      calculating a second standard deviation value, $\sigma 2$, corresponding to the standard deviation of said calculated first standard deviation values.

2. The method according to claim 1, wherein the estimated value indicating the correctness corresponds to said second standard deviation value, $\sigma 2$.

3. The method according to claim 1, wherein said calculated second average value $\sigma 1$aver indicates the correctness of the output signal power.

4. The method according to claim 1, wherein the estimated value indicating the correctness corresponds to said first standard deviation value, $\sigma 1$, if the number of segments is only one.

5. The method according to claim 1, wherein the segments have a similar size.

6. The method according to claim 1, wherein extreme in-situ signal-strength measurements are excluded in the calculations.

7. The method according to claim 1, wherein said segments cover only a part of said coverage area, said part corresponding to substantially 90 degrees of the coverage area in the angular direction.

8. The method according to claim 1, wherein the number of segments has a default value.

9. The method according to claim 8, wherein said default value of the number of segments is nine.

10. The method according to claim 1, wherein the number of segments is configurable by an operator.

11. The method according to claim 1, wherein the number of segments is calculated automatically, depending on the number of imported in-situ signal-strength measurements.

12. The method according to claim 1, wherein a base station in the cell includes a plurality of antenna-sections, and one of the stored parameters comprises an output signal power of each of the antenna-sections of the cell site.

13. The method according to claim 12, wherein one of the stored parameters comprises a height of each of the antenna-sections of the cell site.

14. The method according to claim 12, wherein one of the stored parameters comprises an angular orientation of each of the antenna-sections of the cell site.

15. A cell planning tool for a network configuration, wherein the cell planning tool is provided with an arrangement for determining the correctness of stored parameters associated with a cell site configuration, said arrangement comprising:
   a receiving unit configured to import in-situ signal-strength measurements, SSmeasure, from measuring points located within the coverage area of the cell site; and
   a processing unit configured to:
      predict the signal strength, SSpredict, at each of the measuring points utilizing the stored parameters associated with the cell site configuration;
      calculate the signal-strength difference between imported in-situ signal-strength measurements and the corresponding predicted signal strength for each measuring point; and
      estimate a value indicating the correctness of the stored parameters based on the calculated signal-strength differences, wherein to estimate the value indicating the correctness of the stored parameters, the processing unit:
         divides the coverage area into a selected number of segments;
         calculates a first average value, $\Delta$aver, for each segment separately, corresponding to the average of the calculated signal strength-differences for the segment;

calculates a first standard deviation value, σ1, for each segment separately, corresponding to the standard deviation of said calculated signal strength differences for the segment;

calculates a second average value, σ1aver, corresponding to the average of said calculated first standard deviation values; and calculates a second standard deviation value, σ2, corresponding to the standard deviation of said calculated first standard deviation values.

16. The cell planning tool according to claim 15, wherein the estimated value, indicating the correctness of the stored parameters, corresponds to said second standard deviation value, σ2.

17. The cell planning tool according to claim 15, wherein said second average value, σ1aver, indicates the correctness of the output signal power.

18. The cell planning tool according to claim 15, wherein the estimated correction value, indicating the correctness of the stored parameters, corresponds to said first standard deviation value, σ1, if the number of segments is only one.

19. The cell planning tool according to claim 15, wherein the segments have a similar size.

20. The cell planning tool according to claim 15, wherein said segments cover a part of said coverage area, said part corresponding to substantially 90 degrees of the coverage area in the angular direction.

21. The cell planning tool according to claim 15, wherein the number of segments has a default value.

22. The cell planning tool according to claim 21, wherein said default value of the number of segments is nine.

23. The cell planning tool according to claim 15, wherein the number of segments is configurable by an operator.

24. The cell planning tool according to claim 15, wherein said processing unit is further adapted to calculate the number of segments, depending on the number of imported in-situ signal-strength measurements.

25. The cell planning tool according to claim 15, wherein a base station in the cell includes a plurality of antenna-sections, and one of said stored parameters comprises an output signal power of each of the antenna-sections of the cell site.

26. The cell planning tool according to claim 25, wherein one of the stored parameters comprises a height of each of the antenna-sections of the cell site.

27. The cell planning tool according to claim 25, wherein one of the stored parameters comprises an angular orientation of each of the antenna-sections of the cell site.

* * * * *